United States Patent
Frost

(10) Patent No.: US 8,850,020 B2
(45) Date of Patent: Sep. 30, 2014

(54) RESOURCE AWARE PARALLEL PROCESS DISTRIBUTION ON MULTI-NODE NETWORK DEVICES

(75) Inventor: Daniel C. Frost, Feltham (GB)

(73) Assignee: Cisco Technology, Inc., San Jose, CA (US)

( * ) Notice: Subject to any disclaimer, the term of this patent is extended or adjusted under 35 U.S.C. 154(b) by 129 days.

(21) Appl. No.: 13/193,987

(22) Filed: Jul. 29, 2011

(65) Prior Publication Data

US 2013/0028106 A1 Jan. 31, 2013

(51) Int. Cl.
*G06F 15/173* (2006.01)
*H04L 12/24* (2006.01)

(52) U.S. Cl.
CPC ................................. *H04L 41/0893* (2013.01)
USPC ........... 709/226; 709/223; 709/224; 370/241; 370/252

(58) Field of Classification Search
CPC ......... H04L 67/10; H04L 41/00; H04L 41/08; H04L 41/0803; H04L 41/145; H04L 43/08; H04L 43/0817; H04L 47/70
USPC ......... 370/216, 238, 241, 252, 254, 351–377, 370/384, 386, 389–392, 395.31, 400–401; 709/223–226, 230, 232, 238–244
See application file for complete search history.

(56) References Cited

U.S. PATENT DOCUMENTS

| | | | |
|---|---|---|---|
| 7,120,792 B1 * | 10/2006 | Jacobson et al. | 713/153 |
| 8,161,393 B2 * | 4/2012 | Gillingham et al. | 715/736 |
| 2006/0233182 A1 * | 10/2006 | Appanna et al. | 370/401 |
| 2007/0014231 A1 * | 1/2007 | Sivakumar et al. | 370/216 |
| 2008/0304426 A1 * | 12/2008 | Ward et al. | 370/254 |
| 2012/0016994 A1 * | 1/2012 | Nakamura et al. | 709/226 |
| 2012/0110182 A1 * | 5/2012 | Barsness et al. | 709/226 |
| 2012/0209989 A1 * | 8/2012 | Stewart et al. | 709/224 |

OTHER PUBLICATIONS

Cisco CRS Carrier Routing System 4-Slot Line Card Chassis System Description, Apr. 2011, pp. 1-76.

* cited by examiner

*Primary Examiner* — Awet Haile
*Assistant Examiner* — Eric Myers
(74) *Attorney, Agent, or Firm* — Edell, Shapiro & Finnan, LLC

(57) ABSTRACT

Techniques are provided for monitoring a plurality of independently operating processing nodes in a core data packet routing system, wherein each processing node is running its own operating system instance. A placement decision is made for respective processes on selected ones of the independently operating processing nodes based on a predetermined policy, and then the respective processes are placed, based on the placement decision, on the selected ones of the independently operating processing nodes such that the respective processes become placed processes. A list of placed process/processing node pairs specifying a pairing of the placed processes and the processing nodes on which the placed processes have been placed is maintained so that a user can review the then-current set of process placements.

21 Claims, 4 Drawing Sheets

RESOURCE AWARE PARALLEL PROCESS DISTRIBUTION ON MULTI-NODE NETWORK DEVICES

TECHNICAL FIELD

The present disclosure relates to computer networking.

BACKGROUND

A router is a device that forwards data packets across computer networks. That is, a router performs the data "traffic directing" functions on the Internet. In a typical implementation, a router is connected to two or more data lines from different networks. When data comes in on one of the data lines, the router reads the address information in the packet to determine its ultimate destination. Then, using information in the router's routing table(s), it directs the packet to the next network on its journey or drops (ignores) the packet. A data packet may be passed from one router to another router through the networks of the Internet until the data packet finally arrives at its destination computer.

A "core router" is a router designed to operate in the Internet backbone, or core. To fulfill this role, such a router may be configured to support multiple telecommunications interfaces of the highest speed in use in the core Internet and may be further configured to forward Internet Protocol (IP) packets at full speed on all of those interfaces. A core router may also support the routing protocols being used in the core. A core router may be distinguished from, e.g., an edge router, which is disposed at the edge of a backbone network and connects to core routers.

Modern high-end core routers increasingly act as consolidation platforms that absorb the workload of many disparate legacy devices, in some cases allowing an entire service provider Point of Presence (POP) to be supported by only one or two scaled core platforms. Such platforms often comprise multiple line cards and multiple active route processor modules, i.e., nodes, and a connective switching fabric.

DESCRIPTION OF EXAMPLE EMBODIMENTS

Overview

Described herein are methodologies and related hardware that are configured to manage and monitor a plurality of independently operating processing nodes in a core data packet routing system, wherein each processing node is running its own operating system instance. Within the total system, some software processes run on every processing node, while others require that only a single instance be active in the system. A software process of the latter type is called "placeable." A placement decision is made for respective placeable processes based on a predetermined policy, and then the respective processes are placed, based on the placement decision, on the selected ones of the independently operating processing nodes such that the respective processes become placed processes. A list of placed process/processing node pairs specifying a pairing of the placed processes and the processing nodes on which the placed processes have been placed is maintained so that a user can review the then-current set of process placements.

Example Embodiments

Figure 1A:
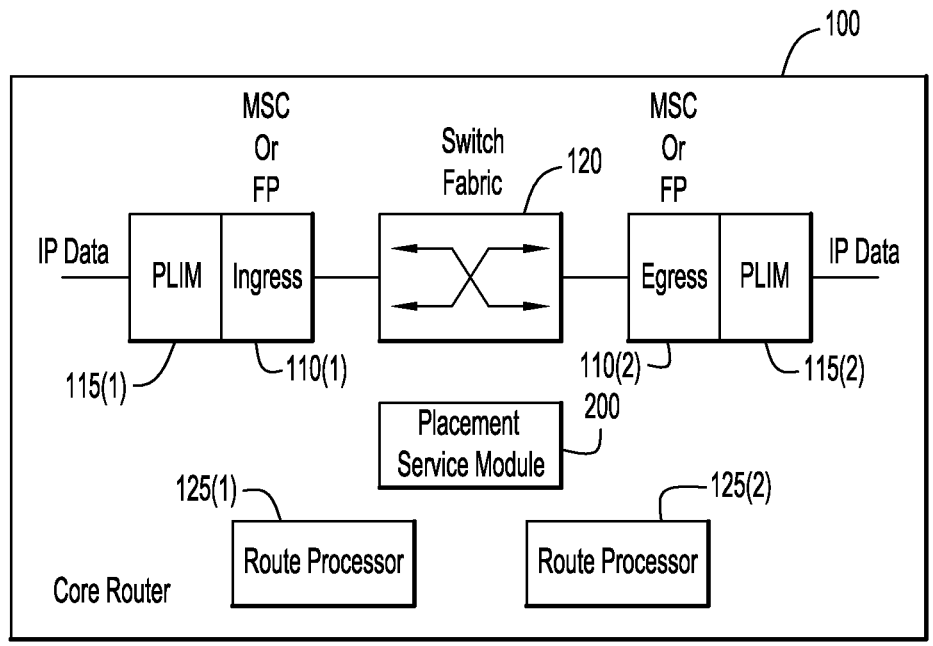
FIG. 1A is an example block diagram of a core router including a placement service module.

FIG. 1A is an example block diagram of a core router 100 that includes a placement service module 200 in accordance with one possible implementation. Core router 100 may be configured as a highly scalable routing platform designed for efficient service-provider point-of-presence (POP) evolution to accommodate growth of the IP network into a multi-services network. Core router 100 may be configured as a physical chassis configured to have, e.g., 4, 8, or 16 line-card receiving slots. Using a 4-slot line card device as an example, core router 100 comprises four slots for modular services cards (MSCs) or forwarding processor (FP) cards 110(1), 110(2), and associated physical layer interface modules (PLIMs) 115(1), 115(2), along with four slots for switch fabric cards 120 (only one of which is shown in FIG. 1A).

Core router 100 also comprises route processor (RP) cards 125(1), 125(2) that perform routing-protocol calculations. RPs 125 can be configured to distribute forwarding tables to the MSCs and FPs 110, to provide a control path to each MSC and FP 110 for system monitoring functions, and to contain hard disks for system and error logging.

The MSC and FP line cards 110 are Layer 3 forwarding engines. As shown in FIG. 1A, each MSC or FP 110 is paired with a corresponding physical layer interface module (PLIM) 115 that contains the packet interfaces for the line card. An MSC or FP 110 can be paired with different types of PLIMs 115 to provide a variety of packet interfaces, such as OC-192 POS and OC-48 POS.

More specifically, a PLIM 115 provides the packet interfaces for the core router 100. Optic modules on the PLIM contain ports to which fiber-optic cables are connected. User data (indicated as IP data in FIG. 1A) is received and transmitted through the PLIM ports, and converted between the optical signals (used in the network) and the electrical signals (used by the line cards within the core router 100). As shown, each PLIM 115 is paired with an MSC or FP 110. As noted above, an MSC 110 provides Layer 3 services for the user data. The PLIM 115 provides Layer 1 and Layer 2 services. Thus, together, an MSC (or FP) and PLIM 115 pair provide Layers 1-3 services for incoming and outgoing data in the form of IP packet data.

Switch fabric 120 can be considered the heart of core router 100. The switch fabric 120 receives user data (IP data packets) from an ingress MSC 110(1) and performs the desired switching to route the data to the appropriate egress MSC 110(2). In one implementation, switch fabric 120 is divided into four planes (e.g., plane 0 to plane 3) that are used to evenly distribute traffic across the switch fabric. Each switch fabric plane may be independent and not synchronized with one another.

Route processor 125 is configured to perform route processing and to distribute forwarding tables to the MSCs 110. Although a given core router might comprise two (or more) RP cards 125(1), 125(2), only one RP 125 (e.g., 125(1)) may be active at a time. The other RP (e.g., 125(2)) operates in standby mode, ready to assume control if the primary RP fails.

Still with reference to FIG. 1A, and as a high level description of the operation of the core router 100, IP data streams are received from the line side (ingress) through optic interfaces on PLIM 115(1). The data streams terminate on the PLIMs. Frames and packets are mapped based on the Layer 2 (L2) headers. The MSC 110(1) provides a common interface between the routing system switch fabric 120 and the several other PLIMs (where only two total PLIMs are shown). PLIMs 115 provide the interface to user IP data and perform Layer 1 and Layer 2 functions, such as framing, clock recovery, serialization and deserialization, channelization, and optical interfacing. Different PLIMs 115 provide a range of optical interfaces, such as very-short-reach (VSR), intermediate-reach (IR), or long-reach (LR).

In one embodiment, a PLIM eight-byte header is generated for packets entering the core router 100. The PLIM header includes, e.g., the port number, the packet length, and summarized layer-specific data. The L2 header is then replaced with the thus-generated PLIM headers and the packet is passed to the MSC 110 for feature applications and forwarding.

The transmit path is essentially the opposite of the receive path. IP data packets are received at the drop side (egress) from the MSC 110(2). An L2 header is generated based on the PLIM eight-byte header received from the MSC 110(2). The packet is then forwarded to appropriate Layer 1 devices (i.e., PLIMs 115) for framing and transmission on outbound fiber.

Figure 1B:
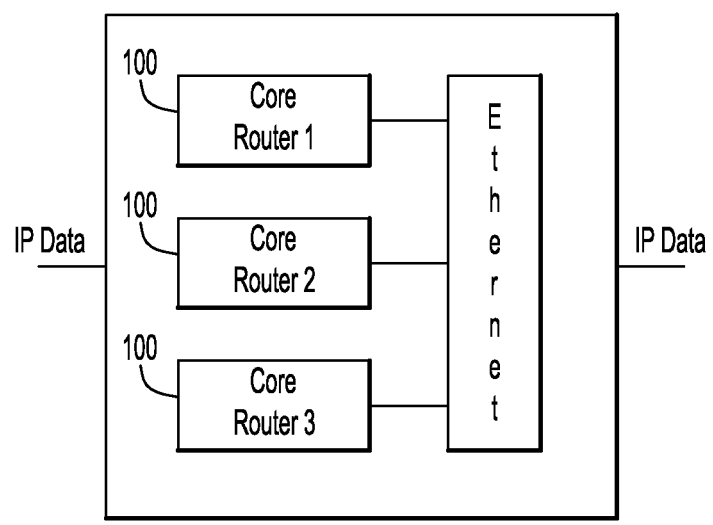
FIG. 1B is an example block diagram of multiple core routers in an aggregated configuration.

As noted, modern high-end core routers increasingly act as consolidation platforms that absorb the workload of many disparate legacy devices, in some cases allowing an entire service provider Point of Presence (POP) to be supported by only one or two scaled core platforms. Such platforms often comprise multiple line cards and multiple active route processor modules, i.e., nodes, and a connective switching fabric. In other words, it is possible to aggregate multiple core routers 100 to effectively function as a single core router. Physically, this may be implemented by placing multiple core routers 100 into a single rack as shown in FIG. 1B and interconnecting the multiple core routers via a specially-designed inter-router switching fabric for high-performance packet forwarding, as well as an optional out-of-band network for system control, such as a system-internal Ethernet network. In such a configuration, rather than only one route processor operating, there may be multiple active route processors operating simultaneously, wherein each route processor is running its own operating system. Placement service module 200 is configured, as will be explained below, to manage processes such that they are placed on selected process nodes, e.g., selected ones of the route processors 125 that are operating on, e.g., any of the core routers shown in FIG. 1B. In the context of the present disclosure, processes, or placeable processes, may include routing and other network control protocol tasks as well as processes that support internal system functions or provide system/network management services to the network operator. Examples of such processes include those that support core routing functions such as those provided by the Intermediate System to Intermediate System (IS-IS), Open Shortest Path First (OSPF), and Border Gateway Protocol (BGP) protocols, and those that provide management and monitoring access to the network operator such as processes that support the operation of the Simple Network Management Protocol (SNMP). Although Placement service module 200 is shown as a separate module within core router 100, the functionality of Placement service module 100 can also be configured to run on respective route processors 125.

Figure 2:
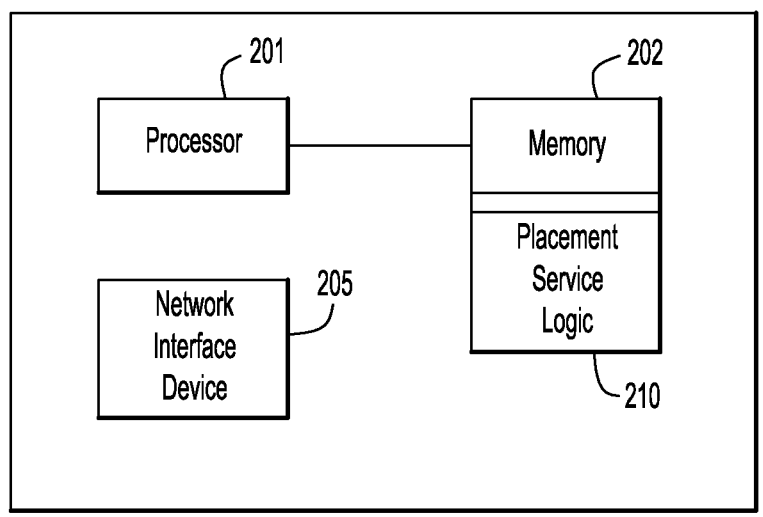
FIG. 2 is an example block diagram of the placement service module shown in FIG. 1.

FIG. 2 is an example block diagram of placement service module 200 shown in FIG. 1. Placement service module 200 may comprise a processor 201, memory 202 and network interface device 205. To the extent the functionality of Placement service module 200 is performed on a given route processor, the hardware shown in FIG. 2 may be shared by the router processor. The memory 202 stores instructions for the placement service module 200 in, e.g., the form of placement service logic 210. The network interface device 205 is configured to perform communications (transmit and receive) over a network (e.g., the Ethernet network shown in FIG. 1B) in order to communicate with processing nodes such as MSCs 110 and other route processors 125.

The memory 202 is, for example, random access memory (RAM), but may comprise electrically erasable programmable read only memory (EEPROM) or other computer-readable memory in which computer software may be stored or encoded for execution by the processor 201. The processor 201 is configured to execute instructions stored in associated memories for carrying out the techniques described herein. In particular, the processor 201 is configured to execute program logic instructions (i.e., software) stored or encoded in memory 202, i.e., placement service logic 210.

The operations of processor 201 may be implemented by logic encoded in one or more tangible media (e.g., embedded logic such as an application specific integrated circuit, digital signal processor instructions, software that is executed by a processor, etc.). The functionality of placement service module 200 may take any of a variety of forms, so as to be encoded in one or more tangible media for execution, such as fixed logic or programmable logic (e.g. software/computer instructions executed by a processor) and the processor 201 may be an application specific integrated circuit (ASIC) that comprises fixed digital logic, or a combination thereof. For example, the processor 201 may be embodied by digital logic gates in a fixed or programmable digital logic integrated circuit, which digital logic gates are configured to perform the operations of the placement service module 200. In one form, the functionality of placement service module 200 is embodied in a processor or computer-readable memory medium (memory 202) that is encoded with instructions for execution by a processor (e.g., processor 201) that, when executed by the processor, are operable to cause the processor to perform the operations described herein in connection with placement service module 200. In one possible implementation, the functionality of the placement service module 200 may be integrated with one or more of the MSCs or FPs 110.

Figure 3:
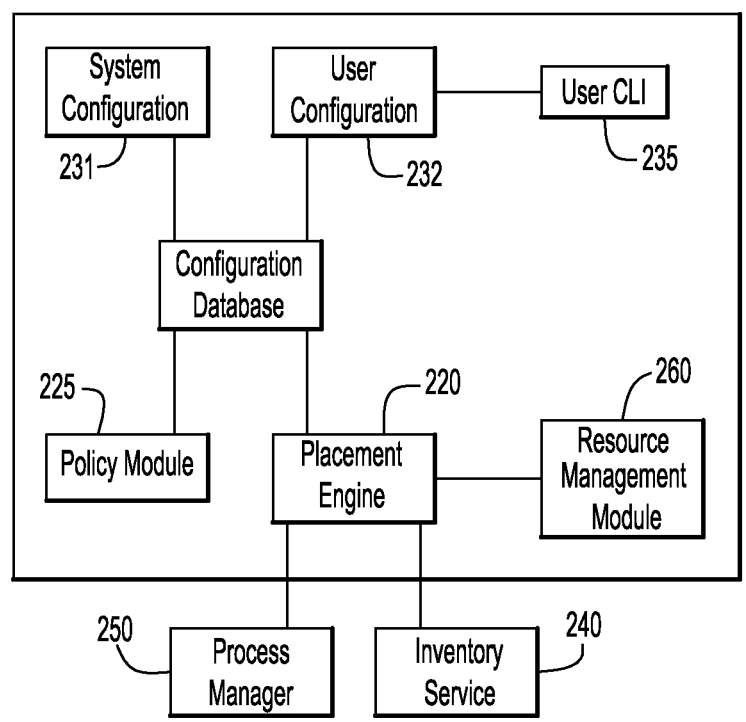
FIG. 3 is another example block diagram of the placement service module shown in FIG. 1.

FIG. 3 is another example block diagram of the placement service module 200 shown in FIG. 1A and FIG. 2. Specifically, FIG. 3 shows elements of the placement service module 200 and their relationships.

A Placement Engine 220 is configured to store and maintain the current placement scheme for the system, i.e. the set of <process, node> pairs specifying the node on which each active placeable process should run. Placement Engine 220 receives node status information from the Inventory Service 240, from which it determines the set of nodes available for placement. Placement Engine 220 also receives system process status information from a Process Manager 250, allowing it to maintain an up-to-date view of the status of all placeable processes. Inventory Service 250 and Process Manager 250 may operate on, e.g., each route processor 125. Process Manager 250 may also be used to start or stop system processes on particular nodes at the request of Placement Engine 220. When a placement decision is to be made, Placement Engine 220 queries the then-active Policy Module 225, which returns the node on which each process is configured to run. The Placement Engine 220 may be further controlled by (a) system and user configuration 231, 232, the data of which may be stored in configuration database 230, and/or (b) command line interface (CLI) commands 235 initiated by the user.

Policy Module 235 implements the placement determination function. In one possible implementation, exactly one policy module is active at any time, selected by configuration and parameterized with a placement set that represents the complete set of placeable entities (i.e., placeable processes or groups of placeable processes) in the system. The function of Policy Module 235 is to determine the node on which each process should run at the instant of request.

Configuration Database 230 maintains configuration information for the Placement Engine 220 and for respective Policy Modules 235, including system-level configuration and user configuration.

User CLI 235 provides services for user interaction with the Placement Engine 220, such as re-optimization and migration requests and show commands for displaying placement-related information.

Policy Module 225 is configured to define a finite sequence of resource dimensions. Each dimension may represent a resource type, such as central processing unit (CPU) time or memory. In one embodiment, each node in the system is assigned a maximum and a reserved value for each dimension. Each system process is assigned a non-negative real number for each dimension, representing its resource requirement for that dimension. A process's configuration can thus be regarded as a point in non-negative n-dimensional real space, assuming there are n resource dimensions defined. The total load of a node can also be regarded as such.

Each process may also be assigned an additional integer value in the range 0-255 called its placement priority, with 0 representing the highest and 255 the lowest priority.

Thus, a complete configuration for a system with 4 nodes and 11 system processes might look as follows:

```
List of resource types dimensions : cpu mem
Node definitions node default : cpu max=100 resv=5
node default : mem max=2048 resv=250
node 0 : cpu max=100 resv=50
node 0 : mem max=2048 resv=500
node 1
node 2
node 3
Process definitions and resource specifications proc a : pri=10 cpu=35 mem=100
proc b : pri=10 cpu=2 mem=10
proc c : pri=5 cpu=75 mem=250
proc d : pri=10 cpu=40 mem=5
proc e : pri=10 cpu=1 mem=100
proc f : pri=10 cpu=2 mem=150
proc g : pri=5 cpu=20 mem=800
proc h : pri=10 cpu=7 mem=50
proc i : pri=10 cpu=4 mem=75
proc j : pri=5 cpu=65 mem=750
proc k : pri=10 cpu=12 mem=1000
```

Priority and resource specifications for each placeable entity in the Placement Set may be determined using the following procedure. For entities comprising a single process, this data is the same as that for the associated system process. For entities comprising a group of several placeable processes, the resource specifications of the entity are taken to be the sum of the specification of the members, and the priority is taken to be the numerical minimum of the member priorities. That is the approach described herein can also be configured to aggregate placeable processes into groups, which may be of particular use in a given practical application. More specifically, the methodology may be configured to aggregate multiple placeable processes into groups, aggregate those groups into bigger groups, etc., forming a hierarchical tree (actually multi-tree) structure. The actual placeable entities can then be considered the roots of these trees (i.e., those groups which are not members of a bigger group). This may be useful because it may be desirable for certain processes always to be placed together.

In one embodiment, the Placement Engine 220 determines where each entity (process or process-group) should be placed using a heuristic method. Specifically, for each resource dimension, the load of a node with respect to that resource is the sum of its reserved value for that resource and the requirements for that resource of all entities currently placed on the node. Thus, the node's total load at a given time can be viewed as a point in n-dimensional real space. For example, referring to the example configuration above, suppose that node 0 currently hosts processes a and b (it is assumed for simplicity that the placeable entities are the processes themselves). Its CPU load would be 50+35+2=87 and its memory load would be 500+100+10=610. Its total load would thus be represented as:

node 0 total load=<87, 610>.

We are interested, however, in determining 'how loaded' the node is relative to its maximum capacities. To do this we replace each value in the total load vector with its ratio against the node's corresponding maximum capacity. Since node 0 has a maximum CPU capacity of 100(%) and a maximum memory capacity of 2048 (MB), we obtain:

node 0 relative load=<0.87, 0.30>.

We now define a function called the loadindex function to be a norm on real n-space, that is a function $R^n \rightarrow R$ which is non-negative, homogeneous, positive-definite, and subadditive. For simplicity, assume that the loadindex function is given by the max norm—the function which simply chooses the maximum value in the vector. The node's loadindex is the value obtained by applying the loadindex function to its relative load. Thus, for node 0:

node 0 loadindex=0.87, which is the max value in the vector.

Placement determination can now be performed. The processes to be placed are first sorted by priority. For each process, and each active node where it would 'fit' (i.e., with enough resource capacity in each dimension to meet the process's requirements), a hypothetical loadindex for the node is computed assuming the process was placed on that node. The process is then placed on the node with the least such loadindex value. The effect is to prefer to place processes on lightly-loaded nodes, and the end result is reasonable distribution of load across the system.

The foregoing approach chooses simplicity over 'completely optimal placement' (which may in any case have many definitions): information is lost when the relative load is mapped to a loadindex value. It does however work well in most practical situations. Different norms (loadindex functions) can also be chosen to achieve different behaviors.

For example, given the configuration example above, the placement determination is as follows:

```
placement:

node 0: b e d
    node 1: c k
    node 2: g a f i h
    node 3: j
loads:

node 0: mem : 615.0 cpu : 93.0
    node 1: mem : 1500.0 cpu : 92.0
    node 2: mem : 1425.0 cpu : 73.0
    node 3: mem : 1000.0 cpu : 70.0
loadindex:

node 0: 0.93
    node 1: 0.92
    node 2: 0.73
    node 3: 0.70
```

Note that in the course of placement determination the placement of an entity may fail. This happens when no node exists with enough remaining resources to support the entity's requirements. When this happens a failure action may be taken, which may be either to halt placement of the entity, or to place the entity anyway and log a warning.

Dynamic Resource Measurement

Due to the sensitivity of core routing environments, static process placement configurations may be more desirable by network operators. That is, even though processes can be placed, placeable processes need not necessarily move around the system on their own by default. Instead, a snapshot approach may be used to allow for the dynamic measurement of process resource usage without impacting the stability of the system. The operator can then inspect the snapshot(s) (which can be in the form of the resource-requirement specifications understood by the placement service module 200) and review the changes to the workload distribution prior to activating a snapshot and triggering the associated changes.

In an embodiment, the system supplies a default configuration that includes the requirements for each process. Such a configuration can of course only be an estimate, and the actual resource requirements for many processes can vary significantly from system to system. It is therefore desirable to have a means of generating resource specifications based on actual resource use. The placement service module can, therefore, also provide a dynamic resource measurement capability that can be used to generate the resource specifications for a placement set.

In this regard, a resource measurement (RM) module 260 can be provided that is independent of the placement service module 200, but which can also be incorporated into Placement service module 200 as shown in FIG. 3. RM module 260 is configured to obtain resource usage data from each system process and store it, and then use the same to generate a resource specification snapshot upon request from a user. The user may then replace the system default resource specification with this snapshot. The snapshot has the same format as the system default specification.

The RM module 260 may include several subcomponents to capture appropriate measurements.

Measurement Ports can be used as system interfaces for resource measurement, with one port for each resource type. Thus, each measurement port provides access to a stream of data samples for a given system process in, e.g., the form: port(resource-type, process)→stream.

Metric Accumulators may be implemented as stream processors that accept a stream of data samples and produce a resource value upon request: accumulator(sample-stream)→value. For example:

A Peak accumulator keeps track of and returns the highest value received. Such an accumulator might be used, for instance, for memory resource types, to record peak memory usage.

An Average accumulator computes and returns a cumulative moving average of the sample values. Note that it is not necessary for the accumulator to store a value history to do this: the cumulative moving average $A_t$ at time t is determined by the formula: $A_t = A_{t-1} + (x_t - A_{t-1})/t$ where $x_t$ is the sample at time t.

A Peak Interval Average accumulator may be configured with a number of samples N. For each sample, this accumulator computes the average value of the N most recent samples, and keeps track of and returns the high water mark of these values. This may be useful, for instance, for routing protocol processes, which tend to be relatively idle most of the time but may consume significant resources for short periods when certain events occur. For example, one might choose to measure percent CPU usage of certain routing protocols such as Open Shortest Path First (OSPF) using a Peak Interval Average accumulator, with a sample rate of 1 per second and N=180. The result would be the highest average CPU utilization percentage of OSPF over a 180-second period.

In an embodiment, the system supplies a default RM configuration that specifies, for each process and each resource type, the metric accumulator used to measure usage of the given resource type for the given process. This configuration may be overridden by the user.

System Defaults and User Configuration Options

Once again, due to the sensitivity of routing functionality, purely automated process placement might not be desirable. Consequently, via user CLI 235 configurations can be overridden by a user including literal resource requirement values, placement priority, placement failure action, and RM accumulator types.

Based on the foregoing, those skilled in the art will appreciate that the described approach provides a scheme for distributing processing workload on large-scale multiprocessor routers based on multidimensional resource requirements (e.g. CPU load, memory, I/O bandwidth). This scheme may be particularly suitable for supporting the network management and operational requirements associated with network devices in service provider cores. Specifically, the placement process can be used to distribute processing tasks among the active processing nodes in the system such that the system workload is well-balanced across the available nodes.

Figure 4:
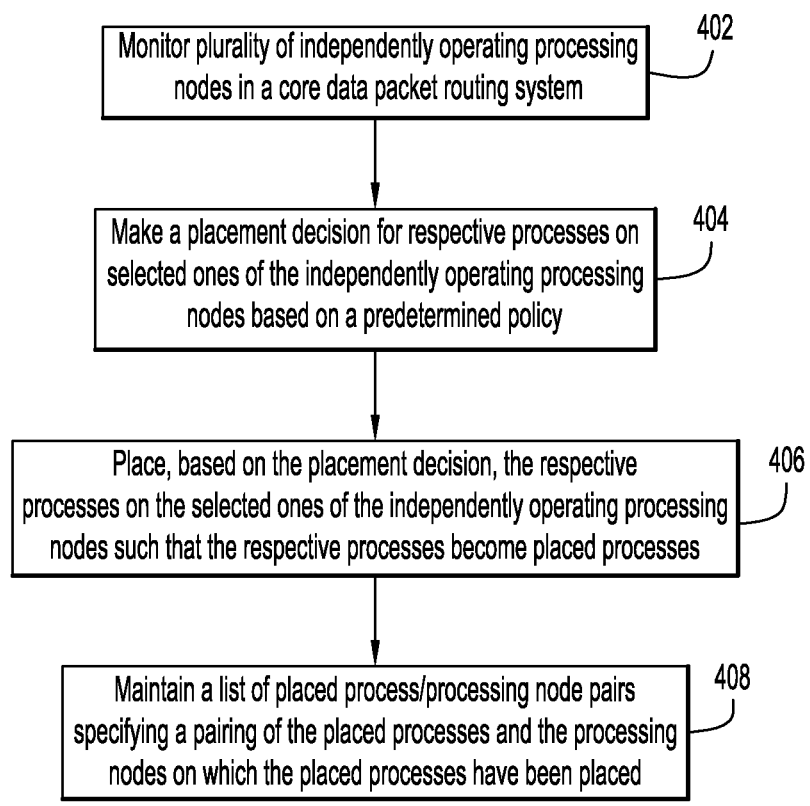
FIG. 4 is an example of a generalized flow chart depicting operations performed by the placement service module.

Reference is now made to FIG. 4 which shows a generalized flow chart depicting operations performed by the placement service module. In one embodiment, as shown, a series of steps might begin with step (or process) 402. This step monitors a plurality of independently operating processing nodes in a core data packet routing system. As previously mentioned, each processing node may be running its own operating system instance. At step 404 a placement decision is made for respective processes on selected ones of the independently operating processing nodes based on a predetermined policy. Then, at step 406, based on the placement decision, the respective processes are placed on the selected ones of the independently operating processing nodes such that the respective processes become placed processes. Finally, at step 408 a list of placed process/processing node pairs specifying a pairing of the placed processes and the processing nodes on which the placed processes have been placed is maintained. This list can be used by a user to obtain a state of the system at a given time. A similar set of information may be presented to a user in connection with a potential change to process placement. In such a case, as explained above, a snapshot might be taken of a proposed placement set before any processes are actually migrated from one processing node to another. Perhaps only upon receipt of user authorization would migration of selected processes to selected ones of the independently operating processing nodes in accordance with the proposed set of process placements be allowed to proceed.

When the placement module is used as described herein in connection with a core data packet routing system, the independently operating processing nodes might include a route processor that generates routing tables for the core data packet routing system or a line card that is included in a router chassis.

In making process placement decisions, several factors may be taken into account. For example, a priority attribute of the respective processes may be considered. Also, the independently operating processing nodes may be assigned a resource maximum value and resource reserve value, and those values may likewise be considered in making a placement decision.

In addition, a total load value of a given independently operating processing node can be calculated given that selected ones of the processes are running on the given node and taking into account the resource reserve value. Using that total load value, it is then possible to calculate a relative load of the given independently operating processing node based on a ratio of the total load to the resource maximum value. The relative load value may be a single point value, or may be an array of values (e.g., representing memory and CPU usage on a given node). Where there is an array of values for the relative load value, it may be beneficial to calculate a load index for each of the independently operating processing nodes, where the load index is a single value that is, for purposes of making the placement decision, representative of a load of a selected independently operating processing node. The load index might simply apply a max function to the array of values to arrive at a single value.

The above description is intended by way of example only.

What is claimed is:

1. A method comprising:
monitoring a plurality of independently operating processing nodes in a core data packet routing system, wherein each processing node is running its own operating system instance;
prioritizing processes for placement on the independently operating processing nodes;
making a placement decision for respective processes on selected ones of the independently operating processing nodes based on calculating a load index for each of the independently operating processing nodes representative of a load of a selected independently operating processing node after placement of the respective process, wherein calculating the load index comprises calculating a ratio of a total load to a resource maximum;
placing, based on the placement decision, the respective processes on the selected ones of the independently operating processing nodes such that the respective processes become placed processes, wherein a process having a highest priority is placed on an operating process node having a lowest load index after placement of the process having the highest priority; and
maintaining a list of placed process/processing node pairs specifying a pairing of the placed processes and the processing nodes on which the placed processes have been placed.

2. The method of claim 1, wherein monitoring the independently operating processing nodes comprises monitoring route processors that generate routing tables for the core data packet routing system.

3. The method of claim 1, wherein monitoring the independently operating processing nodes comprises monitoring a line card of the core data packet routing system.

4. The method of claim 1, further comprising assigning each of the independently operating processing nodes a resource reserve value, and considering the resource reserve value in making the placement decision.

5. The method of claim 4, further comprising calculating a total load of a given independently operating processing node given that selected ones of the processes are running on the given node and taking into account the resource reserve value.

6. The method of claim 5, further comprising calculating a relative load of the given independently operating processing node based on the ratio of the total load to the resource maximum value.

7. The method of claim 1, wherein calculating the load index for each of the independently operating processing nodes comprises calculating a single value configured to make the placement decision.

8. The method of claim 1, wherein monitoring the independently operating processing nodes comprises accumulating resource usage data from the respective independently operating processing nodes including at least one of peak resource use values, average resource use values or peak interval average resource use values.

9. The method of claim 1, further comprising generating a snapshot of a proposed set of process placements, presenting the snapshot to a user, and receiving from the user authorization to cause migration of selected processes to selected ones of the independently operating processing nodes in accordance with the proposed set of process placements.

10. The method of claim 1, further comprising providing an interface for a user to query, configure, override or test a set of placement decisions.

11. The method of claim 1, further comprising aggregating a plurality of the processes into a group; and
wherein placing the respective processes comprises placing the group.

12. A non-transitory, computer-readable memory medium storing instructions that, when executed by a processor, cause the processor to:
monitor a plurality of independently operating processing nodes in a core data packet routing system, wherein each processing node is running its own operating system;
prioritize processes for placement on the independently operating processing nodes;
make a placement decision for respective processes on selected ones of the independently operating processing nodes based on calculating a load index for each of the independently operating processing nodes representative of a load of a selected independently operating processing node after placement of the respective process, wherein calculating the load index comprises calculating a ratio of a total load to a resource maximum;
place, based on the placement decision, the respective processes on the selected ones of the independently operating processing nodes such that the respective processes become placed processes, wherein a process having a highest priority is placed on an operating process node having a lowest load index after placement of the process having the highest priority; and maintain a list of placed process/processing node pairs specifying a pairing of the placed processes and the processing nodes on which the placed processes have been placed.

13. The computer-readable memory medium of claim 12, wherein the instructions that cause the processor to monitor the independently operating processing nodes causes the processor to monitor a route processor that generates routing tables for the core data packet routing system.

14. The computer-readable memory medium of claim 12, wherein the instructions that cause the processor to monitor the independently operating processing nodes causes the processor to monitor a line card of the core data packet routing system.

15. The computer-readable memory medium of claim 12, further storing instructions that, when executed by a processor, cause the processor to assign each of the independently operating processing nodes a resource reserve value, and consider the resource reserve value in making the placement decision.

16. The computer-readable memory medium of claim 12, wherein the instructions that cause the processor to calculate the load index for each of the independently operating processing nodes further cause the processor to calculate the load index as a single value configured to make the placement decision.

17. The computer-readable memory medium of claim 12, further storing instructions that, when executed by a processor, cause the processor to accumulate resource usage data from each process running on the respective independently operating processing nodes including at least one of peak resource use values, average resource use values or peak interval average resource use values and to use the usage data for making the placement decision.

18. The computer-readable memory medium of claim 12, further storing instructions that, when executed by a processor, cause the processor to generate a snapshot of a proposed set of process placements, present the snapshot to a user, and receive from the user authorization to cause migration of selected processes to selected ones of the independently operating processing nodes in accordance with the proposed set of process placements.

19. An apparatus comprising:

a network interface unit configured to communicate with plurality of independently operating processing nodes in a core data packet routing system;

a processor configured to be coupled to the network interface unit, wherein the processor is configured to:

monitor the plurality of independently operating processing nodes, wherein each processing node is running its own operating system;

prioritize processes for placement on the independently operating processing nodes;

make a placement decision for respective processes on selected ones of the independently operating processing nodes based on calculating a load index for each of the independently operating processing nodes representative of a load of a selected independently operating processing node after placement of the respective process, wherein calculating the load index comprises calculating a ratio of a total load to a resource maximum;

place, based on the placement decision, the respective processes on the selected ones of the independently operating processing nodes such that the respective processes become placed processes, wherein a process having a highest priority is placed on an operating process node having a lowest load index after placement of the process having the highest priority; and maintain a list of placed process/processing node pairs specifying a pairing of the placed processes and the processing nodes on which the placed processes have been placed.

20. The apparatus of claim 19, wherein the processor is configured to monitor at least one of a route processor that generates routing tables for the core data packet routing system or a line card of the core data packet routing system.

21. The computer-readable memory medium of claim 12, further storing instructions that, when executed by a processor, cause the processor to aggregate a plurality of the processes into a group; and wherein the instructions that cause the processor to place the respective processes cause the processor to place the group.

* * * * *